US 6,674,577 B2

(12) United States Patent
Slashchenko

(10) Patent No.: US 6,674,577 B2
(45) Date of Patent: Jan. 6, 2004

(54) OPTICAL ELEMENT AND METHOD FOR RECOVERING THE SUBSTRATE

(75) Inventor: Nikolay Slashchenko, Nizhny Novgorod (RU)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 09/955,910

(22) Filed: Sep. 19, 2001

(65) Prior Publication Data

US 2002/0063965 A1 May 30, 2002

(30) Foreign Application Priority Data

Sep. 20, 2000 (RU) .................................... 2000124129

(51) Int. Cl.$^7$ ............................ G02B 27/10; G21K 1/06
(52) U.S. Cl. ........................................ 359/620; 378/84
(58) Field of Search ........................... 359/620; 216/75; 478/477; 378/84

(56) References Cited

U.S. PATENT DOCUMENTS

| 3,850,508 A | * | 11/1974 | Sittig et al. ............... 356/445 |
| 5,265,143 A | | 11/1993 | Early et al. ................. 378/84 |
| 5,310,603 A | * | 5/1994 | Fukuda et al. .............. 428/446 |
| 6,013,399 A | * | 1/2000 | Nguyen ....................... 430/5 |

FOREIGN PATENT DOCUMENTS

| DE | 31 10931 A1 | 9/1982 |
| DE | 37 37 483 A1 | 5/1989 |
| DE | 43 18 178 C2 | 12/1994 |
| EP | 0 422 381 A2 | 4/1991 |
| WO | WO 97/31132 | 8/1997 |

OTHER PUBLICATIONS

Repair of high performance multiplayer coatings, D. P. Gaines et al., *SPIE vol. 1547 Multilayer Optics for Advanced X–Ray Applications*, 1991, pp. 228–238.

* cited by examiner

Primary Examiner—Hung Xuan Dang
Assistant Examiner—Joseph P Martinez
(74) Attorney, Agent, or Firm—Hudak, Shunk & Farine Co. LPA

(57) ABSTRACT

In the production of optical elements, not only flat substrates but also spherical or aspherical substrates are used. The costs of such a substrate can exceed the coating costs by a multiple. Particularly in development work, cost savings may be achieved if a substrate can be used repeatedly. To recover a substrate, it is proposed to provide an interlayer between the substrate and the functional layers, which comprises at least one layer of chromium and one layer of scandium. By immersing the optical element into a hydrochloric acid solution, this interlayer is dissolved, so that the functional layer is also removed from the substrate and the substrate is ready for reuse.

8 Claims, No Drawings

OPTICAL ELEMENT AND METHOD FOR RECOVERING THE SUBSTRATE

FIELD OF THE INVENTION

The invention relates to an optical element that comprises a substrate, an interlayer and at least one functional layer and is suitable for recovery of the substrate. The invention further relates to a method for recovering a substrate of an optical element comprising a substrate, an interlayer and at least one functional layer.

BACKGROUND OF THE INVENTION

When optical elements are produced, not only flat substrates but also spherical or aspherical substrates may be used. In these cases, the costs of the substrate may exceed the coating costs by a multiple. It is therefore useful in development work if a substrate can be used repeatedly. In production, too, it may be advantageous if coatings that do not meet the specifications can be removed again and the substrate reused. The important thing is that the original form of the substrate is not changed and that the roughness of the substrate surface is not increased. Flawed optical elements can, for instance, have inadequate reflectivity or cause image distortion.

The optical elements can have one or more functional layers, which in turn comprise one or several layers. An example to be cited is a mirror for soft x-rays, which is provided with a coating of molybdenum and silicon films on a silicon substrate to reflect the soft x-rays, whereupon a single-layer protective coating is applied.

The requirements for the substrates, including recovered substrates, are discussed in D. P. Gains, et al, SPIE Vol. 1547 (1991) 228–238. This paper also introduces two methods for repairing optical elements. On the one hand, the flawed layers may be covered with additional correct layers. On the other hand, an interlayer between substrate and functional layer may be etched away and the coating thereby removed. Both of these methods have drawbacks. In the first method, flaws in the surface characteristics and the form of the optical element may be propagated through the individual layers. In addition, cracks may form through stresses and cause the coating to be partially detached. The second method has the drawback that removal takes a long time if the surfaces are relatively large.

A good interlayer must be homogenous and have a surface roughness that is as low as possible. In addition, it must be capable of being etched by substances that do not attack the substrate. For this reason, the aforementioned paper proposes aluminum as the interlayer on a silicon-based substrate. This aluminum interlayer is etched by a solution of hydrochloric acid and copper sulfate. However, optical elements with an aluminum interlayer have lower reflectivity than optical elements without this interlayer.

As mentioned above, the removal of functional layers of an optical element by etching away an interlayer is very time-consuming. For in order to be able to etch away the interlayer, the solution must first penetrate through the functional layer(s). Depending on the substance used, the at least one functional layer can also completely prevent the etching of the interlayer.

Another option to remove the coating from a substrate is dry etching. Such methods are described, for instance in WO 97/31132 and European Application EP 0 422 381 A2. In optical elements, however, it has thus far not been possible to optimize the dry etching process in such a way that the functional layers are removed while the substrate is left intact.

Chemical removal has also been attempted on objects other than optical elements.

German Patent DE 31 10 931 describes a method for removing a flawed copper sulfide coating applied to a cadmium sulfide layer, particularly in a process for producing solar cells. The substrate carrying the two layers is immersed into an aqueous cyanide-ion-containing solution until the flawed copper sulfide coating is completely dissolved, forming copper tetracyanide ions. The cadmium sulfide layer is not dissolved.

German Application DE 37 37 483 A1 describes a method for reusing glass substrates for optically readable compact storage masters. The disk-shaped glass substrates are coated with a layer of photoresist, which is partially exposed and developed. They are subsequently provided with an electrically conductive metal coating and a galvanically applied reinforcement. The latter two metal layers are then removed and serve to produce, either directly or after additional duplicating steps, the optically readable disk-shaped information carriers. This method provides that after removal of the photoresist layer, any residues of the electrically conductive metal coating and the galvanically applied reinforcement adhering to the glass plate be removed by rinsing with an acid and water mixture that attacks the metals.

A similar approach is used in German Patent DE 43 18 178 C2, which deals with a process for chemically removing a coating applied to the surface of a substrate made of glass, glass ceramic or ceramic. The decorated glass is brought into contact with hydrochloric acid and/or sodium hydroxide solution or with sulfuric acid and potassium hydroxide.

U.S. Pat. No. 5,265,143 describes an optical element comprising a substrate, an interlayer and a multilayer coating in which the interlayer dissolves 1000 times faster than the substrate material in an etchant solution at a temperature of 130° C. This interlayer consists particularly of germanium. The multilayer coating is typically made of molybdenum and silicon. The etchant solution used is an aqueous solution of 0.88 mol potassium hexacyanoferrate and 1 mol potassium hydroxide. At room temperature, only the molybdenum dissolved; if the solution is heated to above 60° C., the silicon is dissolved as well. However, re-coated recycled substrates partly showed reflectivities that were only 80% of the reflectivity of the original optical elements. This was attributed to increased surface roughness. To counteract this, a barrier layer of a chemically inert material, e.g. ruthenium, was applied between the interlayer and the substrate. For the production of iridium on glass ceramic mirrors it is suggested to use chromium as the interlayer. However, this should be done only in conjunction with a barrier layer since the surface roughness will otherwise excessively increase.

SUMMARY OF THE INVENTION

Against this background, it is the object of the invention to find an optical element, the substrate of which can be reused while retaining an optimal surface quality, as well as a method for recovering the substrate.

This object is attained by an optical element comprising a substrate, an interlayer and at least one functional layer, which is suitable for recovering the substrate and is characterized by an interlayer consisting of at least one layer of chromium and one layer of scandium.

DETAILED DESCRIPTION OF THE INVENTION

This object is further attained by a method for recovering a substrate of an optical element comprising a substrate, a chromium- and scandium-based interlayer and at least one functional layer, wherein the optical element is immersed in a 15%–30% aqueous hydrochloric acid solution.

If an optical element with an interlayer consisting of at least one layer of chromium and one layer of scandium is immersed into a 15%–30% hydrochloric acid bath, the interlayer dissolves with strong gas formation. The parts of the interlayer and particularly the at least one functional layer which are not dissolved by the hydrochloric acid are split off, as it were, by the gas development. This causes both the interlayer and the at least one functional layer to be virtually completely removed from the substrate. This is all the more surprising since chromium is known to passivate when it comes into contact with hydrochloric acid, so that it does not dissolve in hydrochloric acid.

The first layer on the substrate can be either chromium or scandium. The last layer before the functional coating can likewise be either scandium or chromium.

The advantage of the method according to the invention is that the substrate, which is made of silicon, glass or quartz, is not attacked and therefore retains both its shape and its original surface roughness. As a result, optical elements with high reflectivities can be produced even if they are recycled. It has proven to be advantageous if the interlayer comprises about 15–25 layers each of chromium and scandium. Preferably one layer of scandium and one layer of chromium have a combined thickness of 2–3 nm. At these small thicknesses, no crystal growth can take place, which would result in an increased surface roughness. Particularly preferred are equal layer thicknesses for chromium and scandium. Such interlayers have the effect on the one hand that the gas development during etching of the interlayer is sufficient to split off even relatively thick functional layers. On the other hand they have the effect that the substrate is better protected against any reactions with the hydrochloric acid.

To perform the method according to the invention, it has proven to be advantageous if the temperature of the hydrochloric acid bath is greater than 70° C., preferably 78° to 82° C. This increases the reaction rate and makes it possible to keep the optical element in the hydrochloric acid bath for less than 25 minutes while the interlayer and the functional layer(s) are nevertheless dissolved.

In large-area optical elements with thick functional layers, the optical element is preferably cleaned in addition with a mixture of equal parts of 35%–40% aqueous potassium hydroxide solution and 15%–25% aqueous potassium hexacyanoferrate solution. For this purpose, a rag or a wad of cotton wool or some other cleaning item is impregnated with this mixture and is used to wipe the optical element or the now remaining substrate to remove any residues of the interlayer and the at least one functional layer.

The invention will now be described in greater detail by means of the following examples.

EXAMPLE 1

A silicon substrate with an area of 3.14 $cm^2$, which is provided with an interlayer of 15 3 nm thick chromium and scandium layer pairs and a 350 nm thick functional coating of molybdenum and silicon layers, has a reflectivity of 68% at a wavelength of 13.4 nm. To remove the functional layer and the interlayer from the substrate, this multilayer system is immersed for 15 minutes in a 75° C. 25% aqueous hydrochloric acid solution. Thereafter, the recovered silicon substrate is re-coated with an interlayer of 15 chromium and scandium layer pairs having a thickness of 3 nm and with a molybdenum and silicon based functional layer having a thickness of 350 nm. At a wavelength of 13.4 nm a reflectivity of 68% is again reached.

EXAMPLE 2

A silicon substrate with an area of 12.5 $cm^2$, which is provided with an interlayer of 25 2.5 nm thick chromium and scandium layer pairs and aB functional layer of 100 tungsten and silicon layers each having a periodic thickness of 3 nm, has a reflectivity of 35% at a wavelength of 0.99 nm. To remove the functional layer and the interlayer from the substrate, the multilayer system is immersed for 20 min in an 80° C. 30% aqueous hydrochloric acid solution. Thereafter, the recovered silicon substrate is re-coated with an interlayer of 25 chromium and scandium layer pairs having a thickness of 2.5 nm and a tungsten and silicon based functional coating having a thickness of 300 nm. At a wavelength of 0.99 nm a reflectivity of 35% is again reached.

EXAMPLE 3

A silicon substrate with an area of 6.25 $cm^2$, which is provided with an interlayer of 30 2 nm thick chromium and scandium layer pairs and a 225 nm thick functional coating of nickel and carbon layers, has a reflectivity of 29% at a wavelength of 4.47 nm. To remove the functional layer and the interlayer from the substrate, the multilayer system is immersed for 18 minutes in a 70° C. 20% aqueous hydrochloric acid solution. Subsequently, the silicon substrate is cleaned by wiping with a wad of cotton wool dipped into a solution of 2 equal parts of 40% aqueous potassium hydroxide solution and 20% aqueous potassium hexacyanoferrate solution. Thereafter the recovered silicon substrate is re-coated with an interlayer of 30 chromium and scandium layer pairs having a thickness of 2 nm and a nickel and carbon based functional layer having a thickness of 225 nm. At a wavelength of 4.47 nm, a reflectivity of 29% is again reached.

EXAMPLE 4

A quartz substrate with an area of 6.25 $cm^2$, which is provided with an interlayer of 30 2 nm thick chromium and scandium layer pairs and a 240 nm thick functional layer of molybdenum and boron carbide layers, has a reflectivity of 30% at a wavelength of 6.76 nm. To remove the functional layer and the interlayer from the substrate, the multilayer system is immersed for 20 minutes in an 80° C. 23% aqueous hydrochloric acid solution. Subsequently, the quartz substrate is cleaned with a rag using a solution of equal parts of 35% aqueous potassium hydroxide solution and 25% aqueous potassium hexacyanoferrate solution. Thereafter, the recovered quartz substrate is re-coated with an interlayer of 30 chromium and scandium layer pairs having a thickness of 2 nm and a molybdenum and boron carbide based functional layer having a thickness of 240 nm. At a wavelength of 6.76 nm a reflectivity of 30% is again reached.

EXAMPLE 5

A glass substrate with an area of 12.5 $cm^2$, which is provided with an interlayer of 25 3 nm thick chromium and scandium layer pairs and a 272 nm thick functional coating of molybdenum and silicon layers, has a reflectivity of 66% at a wavelength of 13.4 nm. To remove the functional layer and the interlayer from the substrate, the multilayer system is immersed for 15 minutes in an 85° C. 15% aqueous hydrochloric acid solution. Subsequently the glass substrate is cleaned with a solution of equal parts of 45% aqueous potassium hydroxide solution and 15% aqueous potassium hexacyanoferrate solution. Thereafter the recovered glass substrate is re-coated with an interlayer of 25 chromium and scandium layer pairs having a thickness of 3 nm and a molybdenum and silicon based functional layer having a thickness of 272 nm. At a wavelength of 13.4 nm a reflectivity of 66% is reached.

What is claimed is:

1. An optical element comprising a substrate, an interlayer and at least one functional layer, wherein the interlayer consists of at least one layer of chromium and one layer of scandium.

2. An optical element as claimed in claim 1, wherein the interlayer consists of about 15 to about 25 layers each of chromium and scandium.

3. An optical element as claimed in claim 1, wherein within the interlayer, a period consisting of a layer of scandium and a layer of chromium has a thickness of 2 to 3 nm.

4. A method for recovering a substrate of an optical element, which comprises a substrate, a chromium- and scandium-based interlayer, and at least one functional layer, comprising the steps of immersing the optical element in a 15% to 30% aqueous hydrochloric acid solution.

5. A method as claimed in claim 4, wherein the hydrochloric acid solution has a temperature greater than 70° C.

6. A method as claimed in claim 4, wherein the optical element remains in the hydrochloric acid solution for a maximum of 25 minutes.

7. A method as claimed in claim 4, wherein the optical element, after treatment in the hydrochloric acid bath, is cleaned with a mixture of equal parts of 35% to 45% aqueous potassium hydroxide solution and 15% to 25% aqueous potassium hexacyanoferrate solution.

8. A method as claimed in claim 7, wherein the substrate is cleaned by wiping with a cleaning item, particularly with a rag or a wad of cotton wool, impregnated with a potassium hydroxide/potassium hexacyanoferrate/water mixture.

* * * * *